US012632712B2

(12) United States Patent
Gollanapalli et al.

(10) Patent No.: US 12,632,712 B2
(45) Date of Patent: May 19, 2026

(54) METHOD AND ELECTRONIC DEVICE FOR QUANTIZING DNN MODEL

(71) Applicant: SAMSUNG ELECTRONICS CO., LTD., Suwon-si (KR)

(72) Inventors: Tejpratap Venkata Subbu Lakshmi Gollanapalli, Karnataka (IN); Arun Abraham, Karnataka (IN); Raja Kumar, Karnataka (IN); Pradeep Nelahonne Shivamurthappa, Karnataka (IN); Vikram Nelvoy Rajendiran, Karnataka (IN); Prasen Kumar Sharma, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 17/961,453

(22) Filed: Oct. 6, 2022

(65) Prior Publication Data

US 2023/0068381 A1    Mar. 2, 2023

Related U.S. Application Data

(63) Continuation of application No. PCT/KR2022/005122, filed on Apr. 8, 2022.

(30) Foreign Application Priority Data

Apr. 9, 2021    (IN) .............................. 202041044037
Aug. 27, 2021    (IN) .............................. 202141039024
Jan. 25, 2022    (IN) .............................. 202041044037

(51) Int. Cl.
*G06N 3/0495*    (2023.01)
*G06N 3/045*    (2023.01)
(Continued)

(52) U.S. Cl.
CPC ........... *G06N 3/0495* (2023.01); *G06N 3/045* (2023.01); *G06N 3/08* (2013.01); *G06N 3/084* (2013.01);
(Continued)

(58) Field of Classification Search
CPC .......... G06N 3/08; G06N 3/045; G06N 3/084; G06N 3/063; G06N 3/0455; G06N 3/0464;
(Continued)

(56) References Cited

U.S. PATENT DOCUMENTS 11,494,657 B2 *  11/2022  Sather .................... G06N 3/063
11,568,251 B1 *   1/2023  Palkar .................... G06F 18/10
(Continued)

FOREIGN PATENT DOCUMENTS

CN          108537322 A  *  9/2018  .............. G06N 3/02
CN          111027684       4/2020
(Continued)

OTHER PUBLICATIONS

Cohen et al., "Lightweight Compression Of Neural Network Feature Tensors for Collaborative Intelligence," 2020 IEEE International Conference on Multimedia and Expo (ICME), London, UK, 2020, pp. 1-6, doi:10.1109/ICME46284.2020.9102797. (Year: 2020).*
(Continued)

*Primary Examiner* — Andrew L Tank
(74) *Attorney, Agent, or Firm* — Nixon & Vanderhye P.C.

(57)    ABSTRACT

Various embodiments of the disclosure disclose a method for quantizing a Deep Neural Network (DNN) model in an electronic device. The method includes: estimating, by the electronic device, an activation range of each layer of the DNN model using self-generated data (e.g. retro image, audio, video, etc.) and/or a sensitive index of each layer of the DNN model; quantizing, by the electronic device, the
(Continued)

DNN model based on the activation range and/or the sensitive index; and allocating, by the electronic device, a dynamic bit precision for each channel of each layer of the DNN model to quantize the DNN model.

13 Claims, 8 Drawing Sheets

(51) Int. Cl.

| | | |
|---|---|---|
| *G06N 3/063* | (2023.01) | |
| *G06N 3/08* | (2023.01) | |
| *G06N 3/082* | (2023.01) | |
| *G06N 3/084* | (2023.01) | |
| *G06V 10/82* | (2022.01) | |

(52) U.S. Cl.
CPC ............. *G06V 10/82* (2022.01); *G06N 3/063* (2013.01); *G06N 3/082* (2013.01)

(58) Field of Classification Search
CPC ........ G06N 3/082; G06N 3/0495; G06N 3/04; G06V 10/82
See application file for complete search history.

(56) References Cited

U.S. PATENT DOCUMENTS

| | | | | |
|---|---|---|---|---|
| 2016/0328646 | A1 * | 11/2016 | Lin | G06N 3/045 |
| 2018/0046896 | A1 * | 2/2018 | Yu | G06N 3/045 |
| 2019/0122116 | A1 * | 4/2019 | Choi | G06N 3/048 |
| 2019/0251444 | A1 | 8/2019 | Alakuijala et al. | |
| 2019/0354842 | A1 * | 11/2019 | Louizos | G06N 3/084 |
| 2019/0354865 | A1 * | 11/2019 | Reisser | G06N 3/082 |
| 2020/0026986 | A1 * | 1/2020 | Ha | G06N 3/045 |
| 2020/0097823 | A1 * | 3/2020 | Chen | G06N 3/082 |
| 2020/0218962 | A1 | 7/2020 | Lee et al. | |
| 2020/0234112 | A1 | 7/2020 | Wang et al. | |
| 2020/0242473 | A1 * | 7/2020 | De Vangel | G06N 3/063 |
| 2021/0089922 | A1 * | 3/2021 | Lu | G06N 3/04 |
| 2021/0133278 | A1 * | 5/2021 | Fang | G06N 3/08 |
| 2021/0201117 | A1 * | 7/2021 | Ha | G06F 18/15 |
| 2021/0218414 | A1 * | 7/2021 | Malhotra | G06N 5/046 |
| 2021/0224658 | A1 * | 7/2021 | Mathew | G06N 3/04 |
| 2022/0044109 | A1 * | 2/2022 | Donnelly | G06N 3/04 |
| 2022/0044114 | A1 * | 2/2022 | Sriram | G06N 3/045 |
| 2022/0083855 | A1 * | 3/2022 | Choi | G06F 17/18 |
| 2022/0101118 | A1 * | 3/2022 | Yan | G06N 3/082 |
| 2022/0101133 | A1 * | 3/2022 | Ardywibowo | G06N 3/084 |
| 2022/0164666 | A1 * | 5/2022 | Liu | G06N 3/082 |
| 2022/0343162 | A1 * | 10/2022 | Lee | G06N 3/082 |

FOREIGN PATENT DOCUMENTS

| | | | | |
|---|---|---|---|---|
| CN | 111783961 | 10/2020 | | |
| CN | 111931906 | 11/2020 | | |
| CN | 112016674 | 12/2020 | | |
| KR | 10-2020-0086581 | 7/2020 | | |
| WO | WO-2020160787 A1 * | 8/2020 | ............. | G06N 3/045 |

OTHER PUBLICATIONS

Ding et al., "Quantized deep neural networks for energy efficient hardware-based inference," 2018 23rd Asia and South Pacific Design Automation Conference (ASP-DAC), Jeju, Korea (South), 2018, pp. 1-8, doi:10.1109/ASPDAC.2018.8297274. (Year: 2018).*

Hubara et al., "Improving post training neural quantization: Layer-wise calibration and integer programming." arXiv preprint arXiv: 2006.10518, 2020, doi:10.48550/arXiv.2006.10518. (Year: 2020).*

Chen et al., "Deep neural network quantization via layer-wise optimization using limited training data." Proceedings of the AAAI Conference on Artificial Intelligence. vol. 33. No. 01., 2019, doi:10.1609/aaai.v33i01.33013329. (Year: 2019).*

Qiu et al., "Deep Quantization: Encoding Convolutional Activations with Deep Generative Model," 2017 IEEE Conference on Computer Vision and Pattern Recognition (CVPR), Honolulu, HI, USA, 2017, pp. 4085-4094, doi:10.1109/CVPR.2017.435. (Year: 2017).*

Seo et al., "Efficient Weights Quantization of Convolutional Neural Networks Using Kernel Density Estimation based Non-uniform Quantizer" Applied Sciences 9, No. 12: 2559, 2019, doi:10.3390/app9122559. (Year: 2019).*

Amir Gholami, et al., "A Survey of Quantization Methods for Efficient Neural Network Inference", arXiv:2103.13630v1, Mar. 2021, 29 pages.

Tej Pratap Gvsl, et al., "Hybrid and Non-Uniform Quantization Methods Using Retro Synthesis Data for Efficient Inference", arXiv:2012.13716v1, Dec. 2020, 14 pages.

Raghuraman Krishnamoorthi, "Quantizing deep convolutional networks for efficient inference: A whitepaper", arXiv preprint arXiv:1806.08342, Jun. 2018, 36 pages.

Dongqing Zhang, et al., "LQ-Nets: Learned Quantization for Highly Accurate and Compact Deep Neural Networks", In the European Conference on Computer Vision (ECCV), Sep. 2018, 18 pages.

International Search Report for PCT/KR2022/005122 dated Jul. 22, 2022, 4 pages.

Written Opinion of the ISA for PCT/KR2022/005122 dated Jul. 22, 2022, 4 pages.

Examination Report dated Oct. 28, 2022 issued by the India Patent Office for Indian Patent Application No. 202041044037.

* cited by examiner

Figure 2B:
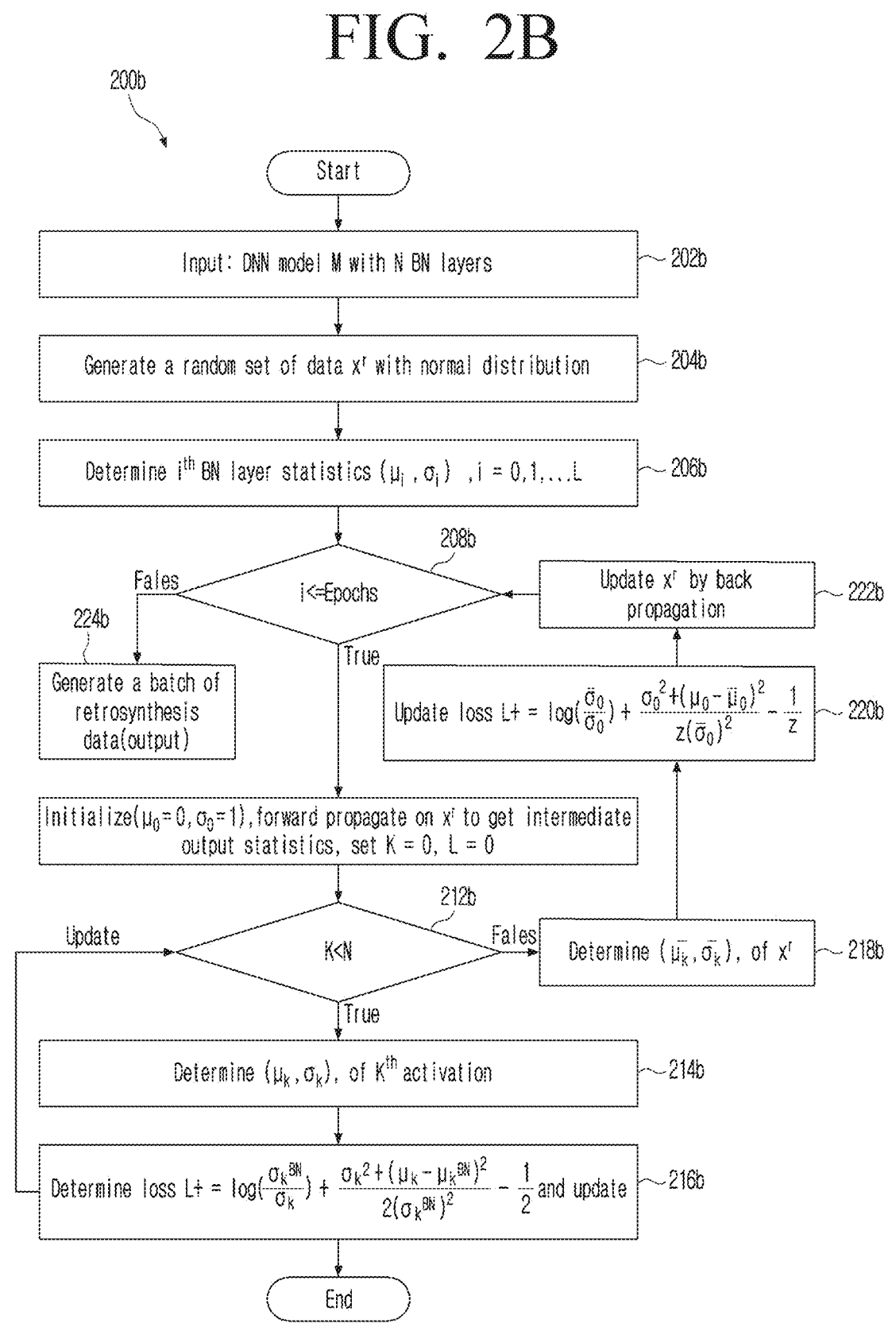

Start

Input: DNN model M with N BN layers ～ 202b

Generate a random set of data $x^r$ with normal distribution ～ 204b

Determine $i^{th}$ BN layer statistics $(\mu_i, \sigma_i)$, $i = 0, 1, \ldots L$ ～ 206b 208b $i \leq$ Epochs — Fales Update $x^r$ by back propagation ～ 222b 224b Generate a batch of retrosynthesis data(output)

True

Update loss $L{+} = \log(\frac{\bar{\sigma}_0}{\bar{\sigma}_0}) + \frac{\sigma_0^2 + (\mu_0 - \bar{\mu}_0)^2}{z(\bar{\sigma}_0)^2} - \frac{1}{z}$ ～ 220b Initialize $(\mu_0 = 0, \sigma_0 = 1)$, forward propagate on $x^i$ to get intermediate output statistics, set $K = 0$, $L = 0$ 212b $K < N$ — Update / Fales Determine $(\bar{\mu}_k, \bar{\sigma}_k)$, of $x^r$ ～ 218b True Determine $(\mu_k, \sigma_k)$, of $K^{th}$ activation ～ 214b Determine loss $L{+} = \log(\frac{\sigma_k^{BN}}{\sigma_k}) + \frac{\sigma_k^2 + (\mu_k - \mu_k^{BN})^2}{2(\sigma_k^{BN})^2} - \frac{1}{2}$ and update ～ 216b End

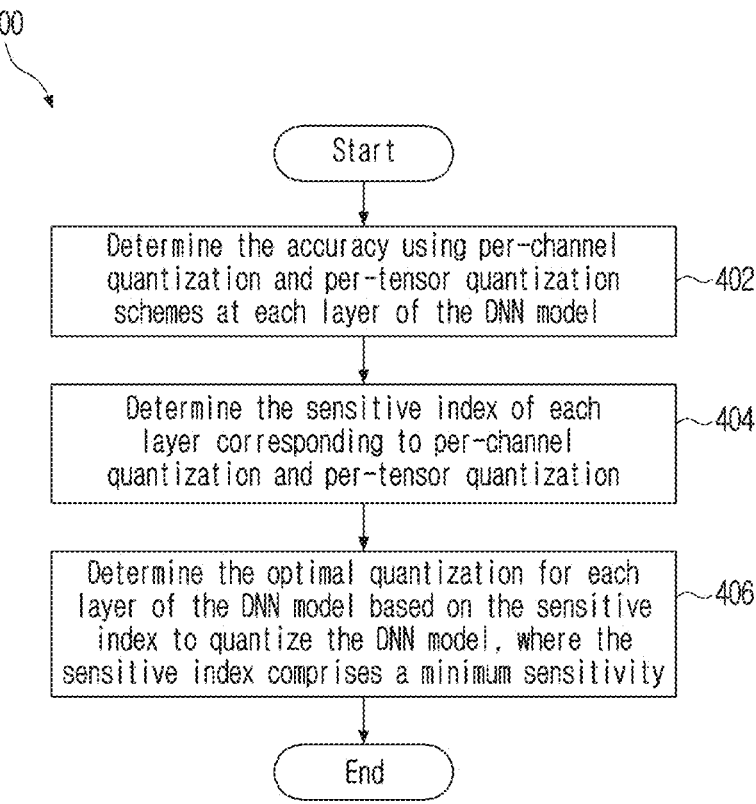

Start

Determine the accuracy using per-channel quantization and per-tensor quantization schemes at each layer of the DNN model ∼402

Determine the sensitive index of each layer corresponding to per-channel quantization and per-tensor quantization ∼404

Determine the optimal quantization for each layer of the DNN model based on the sensitive index to quantize the DNN model, where the sensitive index comprises a minimum sensitivity ∼406

End

METHOD AND ELECTRONIC DEVICE FOR QUANTIZING DNN MODEL

CROSS-REFERENCE TO RELATED APPLICATIONS

This application is a continuation of International Application No. PCT/KR2022/005122 designating the United States, filed on Apr. 8, 2022, in the Korean Intellectual Property Receiving Office and claiming priority to Indian Provisional Patent Application No. 202041044037, filed on Apr. 9, 2021, in the Indian Patent Office, Indian Provisional Patent Application No. 202141039024, filed on Aug. 27, 2021, in the Indian Patent Office, and to Indian Complete Patent Application No. 202041044037, filed on Jan. 25, 2022, in the Indian Patent Office, the disclosures of all of which are incorporated by reference herein in their entireties.

BACKGROUND

Field

The disclosure relates to an electronic device, and for example, to a method and an electronic device for quantizing a Deep Neural Network (DNN) model.

Description of Related Art

In general, Deep Neural Network (DNN) model has achieved excellent results in visual and voice domains such as image identification, image segmentation, image detection, speech synthesis, and so on. However, the DNN model approach appears to necessitate a larger memory footprint and computational expenditure, making it difficult to run on embedded devices such as smartphones. As a result, several compression strategies have been developed in order to deploy the DNN models on tiny embedded hardware such as the smartphones and edge devices. Quantization of weights and activation to lower precision, such as 8-bit integers (INT8), INT6, and INT4, is one such approach that solves memory and computational concerns, albeit at the expense of reduced accuracy.

The quantization is an essential technique for running larger DNN models on to run heavier DNN models and most important characteristic for efficient DNN acceleration in a variety of resource-constrained devices such as the smartphones and the edge devices, home appliances, and microcontrollers. The quantization technique/method can be broadly categorized as post-training quantization and quantization aware training.

Post-training quantization: where a trained model is quantized using different techniques using training data. These methods don't need to retrain the model (e.g., DNN model), instead, they quantize the model with the help of training data set (around 3 k to 5 k images).

Quantization aware training is a technique in which the quantized model is trained with training data. These methods are time-consuming as they need complete retraining of the model with the entire training data set.

Certain existing quantization techniques have drawbacks such as being time-consuming since retraining is required (a) or having a large picture dataset (b) and being inapplicable for privacy applications where the dataset cannot be shared (e.g. credit card data, personal images, medical or legal information, etc.). Some other existing quantization techniques are vendor dependent (e.g. Qualcomm, Google (in Tensor flow), Facebook, Huawei, etc.), which means that the suggested techniques must exchange data or models with the vendor, which is challenging in the case of security applications.

Furthermore, existing quantization techniques for pixel processing use cases on Digital Signal Processor (DSP) and Neural Processing Unit (NPU) hardware fail to deliver reliable results with the INT8 quantization. As a result, developers are resorting to INT16 models for more accuracy, which cannot be run on the DSP and the NPU hardware. Thus, it is desired to provide a useful alternative for quantizing the DNN model.

SUMMARY

Embodiments of the disclosure provide a novel post-training quantization method for a Deep Neural Network (DNN) model compression and fast inference by generating data (self-generated data) for quantizing weights and activations at lower bit precision without access to training/validation dataset. While existing methods of post-training quantization require access to training dataset to quantize the weights and activations or require to retrain the entire DNN model for a random number of epochs to adjust the weights and the activations. The data is generated using layer statistics of an original DNN model and weight distributions of the original DNN model. The self-generated data estimates activation ranges for quantization. When compared to other existing quantization methods, the novel post-training quantization method reduces the DNN model size by at least 4×, is faster, and still achieves the best accuracy. The novel post-training quantization method enables the DNN model to run on acceleration hardware such as Graphics processing unit (GPU), Digital Signal Processor (DSP), and Neural Processing Unit (NPU) without loss in accuracy as compared to executing on Central Processing Unit (CPU). The novel post-training quantization method enables users to realize complex use cases on a smartphone platform with better performance without accessing the training data.

Embodiments of the disclosure provide a novel hybrid quantization method to decide per-tensor configuration scheme and/or per-channel configuration for each level in the DNN model for faster inference without loss in the accuracy. The hybrid quantization method efficiently creates a hybrid 'Per-tensor' and 'Per-channel' quantization configuration for the DNN model by estimating a sensitive index of each layer/level of the DNN model using a Kullback-Leibler Divergence (KL divergence).

Embodiments of the disclosure provide a flexible bit allocation method for mixed precision. The flexible bit allocation method keeps different bit precision for different channels of a layer with the constraint that overall bit precision of the layer remains the same.

Accordingly, example embodiments of the disclosure provide a method for quantizing a Deep Neural Network (DNN) model in an electronic device. The method includes: estimating, by the electronic device, an activation range of each layer of the DNN model using self-generated data (e.g. retro image, audio, video, etc.) and/or a sensitive index of each layer of the DNN model. The method may further include: quantizing, by the electronic device, the DNN model based on the activation range and/or the sensitive index.

According to an example embodiment, the self-generated data is generated based on layer statistics (e.g. mean, variance, etc.) of the DNN model and/or weight distributions of the DNN model.

According to an example embodiment, the DNN model quantizes weights and activation at lower bit precision (e.g. 8-bit integers (INT8), INT6, INT4, etc.) without access to training dataset and/or validation dataset to obtain a compression of the DNN model and a fast inference of the DNN model.

According to an example embodiment, estimating, by the electronic device, the activation range of each layer of the DNN model using the self-generated data includes: determining, by the electronic device, a plurality of random images, where each random image of the plurality of random images includes uniform distribution data across the images (generated data images always follow the normal/uniform distribution). The method may further include passing, by the electronic device, each random image into the DNN model. The method may further include determining, by the electronic device, the weight distributions of the DNN model for each random image after each layer of the DNN model. The method may further include determining, by the electronic device, the layer statistics of the DNN model for each random image after each layer of the DNN model, where the layer statistics of the DNN model includes a mean and/or variance. The method may further include determining, by the electronic device, a difference (loss) between pre-stored layer statistics of the DNN model and the determined layer statistics of the DNN model. The method may further include determining, by the electronic device, whether the difference (loss) is less than a threshold. Further, the method includes generating the data using the layer statistics of the DNN model and/or the weight distributions of the DNN model in response to determining that the difference (loss) is less than the threshold. The method may further include performing back propagation in the DNN model in response to determining that the difference (loss) is greater than the threshold.

According to an example embodiment, the self-generated data may include a plurality of retro data images, where the plurality of retro data images are equivalent or represent all features of the DNN model.

According to an example embodiment, estimating, by the electronic device, the activation range of each layer of the DNN model using the self-generated data includes: determining, by the electronic device, the plurality of random images, where each random image of the plurality of random images includes the uniform distribution data across the images. The method may further include passing, by the electronic device, each random image into the DNN model. The method may further include determining, by the electronic device, the weight distributions of the DNN model for each random image after each layer of the DNN model, where the weight distributions at each layer of the DNN model are a Gaussian distribution. The method may further include determining, by the electronic device, the layer statistics of the DNN model for each random image after each layer of the DNN model using a Z-score, where the layer statistics of the DNN model includes the mean and/or the variance. The method may further include determining, by the electronic device, the difference (loss) between pre-stored layer statistics of the DNN model and the determined layer statistics of the DNN model. The method may further include determining, by the electronic device, whether the difference (loss) is less than the threshold. The method may further include generating the data using the layer statistics of the DNN model and/or the weight distributions of the DNN model in response to determining that the difference (loss) is less than the threshold. The method may further include performing back propagation in the DNN model in response to determining that the difference (loss) is greater than the threshold.

According to an example embodiment, the Z-score estimates a difference between two distributions (the mean and standard deviation distribution of the original model and the computed mean and standard deviation distribution with the random data), or determines the difference in mean and variance between the two distributions.

According to an example embodiment, estimating, by the electronic device, the sensitive index of each layer of the DNN model includes: determining, by the electronic device, an accuracy using per-channel quantization and per-tensor quantization schemes at each layer of the DNN model. The accuracy may be defined as the difference between the output of each layer in the original model and one of the proposed quantization methods (per layer or per channel). The above-mentioned accuracy is determined by the electronic device utilizing the KL divergence method. The accuracy is calculated to decide which quantization method (per-channel or per-tensor) is best for that layer. The method may further include: determining, by the electronic device, the sensitive index of each layer corresponding to per-channel quantization and per-tensor quantization. According to an example embodiment, estimating the sensitive index for each layer of the DNN model by the electronic device includes: determining the sensitive index using the per-channel quantization and the per-tensor quantization schemes by comparing the layer output with these schemes to the original model output at that particular layer.

According to an example embodiment, quantizing, by the electronic device, the DNN model based the sensitive index includes: determining, by the electronic device, an optimal quantization for each layer of the DNN model based on the sensitive index, where the sensitive index includes a minimum sensitivity.

According to an example embodiment, the sensitive index is determined using a Kullback-Leibler Divergence.

According to an example embodiment, the optimal quantization includes: the per-channel quantization and/or the per-tensor quantization, and/or a combination of the per-channel quantization and the per-tensor quantization for the DNN model.

According to an example embodiment, the sensitive index is used to reduce a Search space (S) of each layer of the DNN model from exponential ($2^n$) to linear (2n), wherein n is a number of layers in the DNN model.

According to an example embodiment, the method includes: allocating, by the electronic device, a dynamic bit precision for each channel of each layer of the DNN model, allocate 'N' number of intervals to 'C' number of channels in a layer so that the total quantization noise of the layer is minimized in terms of mean-square-error.

Accordingly, example embodiments of the disclosure provide an electronic device configured to quantize the DNN model. The electronic device includes: a quantization engine comprising processing circuitry and/or executable program instructions coupled with a processor and a memory. The quantization engine is configured to: estimate the activation range of each layer of the DNN model using the self-generated data and the sensitive index of each layer of the DNN model. The quantization engine is further configured to quantize the DNN model based on the at least one of the activation range and the sensitive index.

These and other aspects of the disclosure will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein, and the embodiments herein include all such modifications.

BRIEF DESCRIPTION OF THE DRAWINGS

This disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which:

FIG. 2B is diagram flowchart illustrating an example method for generating the self-generated data to estimate the activation range of each layer of the DNN model to quantize the DNN model, according to various embodiments;

FIG. 4 is a flowchart illustrating an example method for hybrid quantization, according to various embodiments.

DETAILED DESCRIPTION

Figure 1:
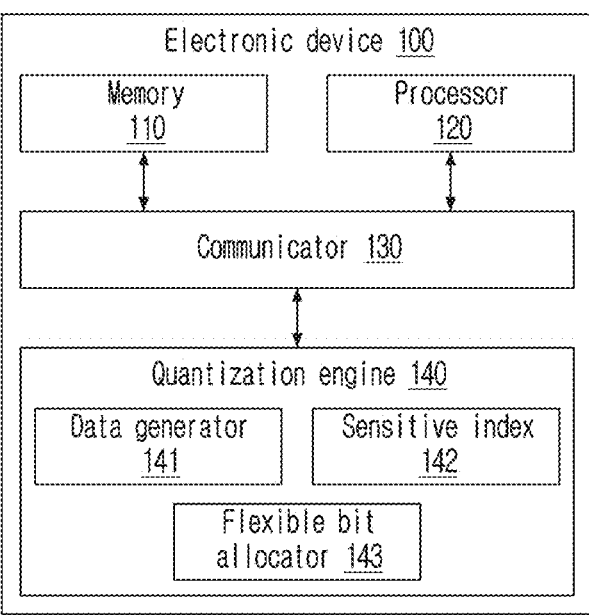
FIG. 1 is a block diagram illustrating an example configuration of an electronic device for quantizing a Deep Neural Network (DNN) model, according to various embodiments.

The various example embodiments herein and the various features and advantageous details thereof are explained more fully with reference to the non-limiting example embodiments that are illustrated in the accompanying drawings and detailed in the following description. Descriptions of well-known components and processing techniques may be omitted so as to not unnecessarily obscure the disclosure herein.

The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, various example embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Certain existing quantization techniques have drawbacks such as being time-consuming since retraining is required (a) or having a large picture dataset (b) and being inapplicable for privacy applications where the dataset cannot be shared (e.g. credit card data, personal images, medical or legal information, etc.). Some other existing quantization techniques are vendor-dependent, which may refer to suggested techniques exchanging data or models with a vendor, which is challenging in case of security applications. Furthermore, existing quantization techniques for pixel processing use cases on Digital Signal Processor (DSP) and Neural Processing Unit (NPU) hardware fail to deliver reliable results with the INT8 quantization. As a result, developers are resorting to INT16 models for more accuracy, which cannot be run on the DSP and the NPU hardware. Thus, it is desired to provide a useful alternative for quantizing the DNN model.

Furthermore, existing post-training quantization techniques require access to training the data to quantize weights and activations and/or require to retrain the entire model for a random number of epochs to adjust the weights and activations of a Floating Point 32-bit (FP32) model. However, the existing post-training quantization techniques are computationally intensive and require enormous time/memory/power consumption, and also require access to original training data.

In the existing quantization techniques, the weight quantization is performed by determining min and max ranges of the FP32 model weights and mapping them to corresponding ranges of $[0 \text{ to } 2^k-1]$ where 'k' is a bit precision, e.g. [0-255] for an 8-bit k=8. Which is performed for all layers of the FP32 model having weight parameters. That was necessary to collect activation ranges from the original FP32 model in order to determine quantized activation ranges. Unlike weights, that is necessary to run a forward pass using all training data samples and then estimate respective activation ranges from the corresponding layer outputs in order to estimate the activation ranges accurately. Hence, estimating the quantized activation ranges without access to the training data is difficult. An alternative is to use Gaussian random data with a 'zero mean' and 'unit variance.' However, that may lead to inaccurate estimation of the activation ranges and, results poor accuracy.

Accordingly, example embodiments of the disclosure provide a method for quantizing a Deep Neural Network (DNN) model in an electronic device. The method includes estimating, by the electronic device, the activation range of each layer of the DNN model using self-generated data (e.g. retro image, audio, video, etc.) and/or a sensitive index of each layer of the DNN model. Further, the method includes quantizing, by the electronic device, the DNN model based on the activation range and/or the sensitive index.

Accordingly, various example embodiments herein disclose an electronic device for quantizing the DNN model. The electronic device includes a quantization engine (e.g., including various processing circuitry and/or executable program instructions) coupled with a processor and a memory. The quantization engine is configured to estimate the activation range of each layer of the DNN model using the self-generated data and the sensitive index of each layer of the DNN model. Further, the quantization engine is configured to quantize the DNN model based on the at least one of the activation range and the sensitive index.

Unlike existing methods and systems, the disclosed methods allow the electronic device to perform a post-training quantization for the DNN model compression and fast inference by generating data (self-generated data) for quantizing weights and activations at lower bit precision without access to training/validation dataset. While existing methods of post-training quantization require access to the training dataset to quantize the weights and activations or require to retrain the entire DNN model for a random number of epochs to adjust the weights and the activations. The data is generated using layer statistics of an original DNN model and weight distributions of the original DNN model. The self-generated data estimates activation ranges for quantization. When compared to other existing quantization methods, the novel post-training quantization method reduces the DNN model size by, for example, at least 4×, is faster, and still achieves the best accuracy. The novel post-training quantization method enables the DNN models to run on acceleration hardware such as Graphics processing unit (GPU), Digital Signal Processor (DSP), and Neural Processing Unit (NPU) without or with reduced loss in accuracy as compared to executing on CPU. The novel post-training quantization method enables the users to realize complex use cases on a smartphone platform with better performance without accessing the training data.

Unlike existing methods and systems, the disclosed method allows the electronic device to perform a hybrid quantization to determine per-tensor configuration and/or per-channel configuration for each level in the DNN model for faster inference without loss in accuracy. The hybrid quantization method efficiently creates a hybrid 'Per-tensor' and 'Per-channel' quantization configuration for the DNN model by estimating a sensitive index of each layer/level of the DNN model using a Kullback-Leibler Divergence (KL divergence).

Unlike existing methods and systems, the disclosed method allows the electronic device to perform a flexible bit allocation for mixed precision. The flexible bit allocation method keeps different bit precision for different channels of a layer with the constraint that overall bit precision of the layer remains the same.

Unlike existing methods and systems, the disclosed method allows the electronic device to reduce the bit precision of weights and activation values to INT8, INT6, etc. Further, the electronic device provides better accuracy even with INT8 precision and hence developers can make efficient use of existing NPU and DSP hardware. Further, the electronic device provides a significant reduction in memory footprint, power consumption, and gains in computational speed make quantization an efficient approach for deploying neural networks to embedded hardware.

Referring now to the drawings, and more particularly to FIGS. 1 through 5, there are shown various example embodiments.

FIG. 1 is a block diagram illustrating an example configuration of an electronic device (100) for quantizing a Deep Neural Network (DNN) model, according to various embodiments. The electronic device (100) can be, for example, but is not limited, to a smartphone, a tablet computer, a Personal Digital Assistance (PDA), an Internet of Things (IoT) device, a wearable device, etc.

In an embodiment, the electronic device (100) includes a memory (110), a processor (e.g., including processing circuitry) (120), a communicator (e.g., including communication circuitry (130), and a quantization engine (e.g., including various processing circuitry and/or executable program instructions) (140).

In an embodiment, the memory (110) is configured to store self-generated data, an activation range of each layer of the DNN model, a sensitive index of each layer of the DNN model, a pre-stored layer statistics of the DNN model, and a dynamic bit precision for each channel of each layer of the DNN model. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) may include various processing circuitry and communicates with the memory (110), the communicator (130), and the quantization engine (140). The processor (120) is configured to execute instructions stored in the memory (110) and to perform various processes. The processor (120) may include one or a plurality of processors, and may, for example include a general-purpose processor, such as, for example, and without limitation, a central processing unit (CPU), an application processor (AP), a dedicated processor, or the like, a graphics-only processing unit such as a graphics processing unit (GPU), a visual processing unit (VPU), and/or an Artificial intelligence (AI) dedicated processor such as a neural processing unit (NPU).

The communicator (130) may include various communication circuitry and is configured for communicating internally between internal hardware components and with external devices via one or more networks (e.g. Radio technology). The communicator (130) includes an electronic circuit specific to a standard that enables wired or wireless communication.

The quantization engine (140) may, for example, be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the quantization engine (140) includes a data generator (141), a sensitive index controller (142), and a flexible bit allocator (143), each of which may include various processing circuitry and/or executable program instructions.

The data generator (141) estimates the activation range of each layer of the DNN model using self-generated data (e.g. retro image, audio, video, etc.). The self-generated data is generated based on layer statistics (e.g. mean, variance, etc.) of the DNN model and/or weight distributions of the DNN model. Further, the data generator (141) quantizes the DNN model based on the activation range. The data generator (141) quantizes weights and activation at lower bit precision without access to training dataset and/or validation dataset to obtain compression of the DNN model and fast inference of the DNN model.

In an embodiment, the data generator (141) determines a plurality of random images (example can be extended, but are not limited, to audio, video, etc.), where each random image of the plurality of random images includes uniform distribution data across the images. Further, the data generator (141) passes each random image into the DNN model. Further, the data generator (141) determines the weight distributions of the DNN model for each random image after each layer of the DNN model. Further, the data generator (141) determines the layer statistics of the DNN model for each random image after each layer of the DNN model, where the layer statistics of the DNN model include a mean and/or variance. Further, the data generator (141) determines a difference (loss) between pre-stored layer statistics of the DNN model and the determined layer statistics of the DNN model. Further, the data generator (141) determines whether the difference (loss) is less than a threshold. Further, the data generator (141) generates the data using the layer statistics of the DNN model and/or the weight distributions of the DNN model in response to determining that the difference (loss) is less than the threshold. The data (self-generated data) is a plurality of retro data images, where the plurality of retro data images are equivalent or represents all features of the DNN model. Further, the data generator (141) performs back propagation in the DNN model in response to determining that the difference (loss) is greater than the threshold.

In an embodiment, the data generator (141) determines the plurality of random images, where each random image of the plurality of random images includes uniform distribution data across the images. Further, the data generator (141) passes each random image into the DNN model. Further, the data generator (141) determines the weight distributions of the DNN model for each random image after each layer of the DNN model, where the weight distributions at each layer of the DNN model are a Gaussian distribution. Further, the data generator (141) determines the layer statistics of the DNN model for each random image after each layer of the DNN model using a Z-score, where the layer statistics of the DNN model includes a mean and/or variance. The Z-score estimates the difference between two distributions (the mean and standard deviation distribution of the original model and the computed mean and standard deviation distribution with the random data). Further, the data generator (141) determines the difference (loss) between the pre-stored layer statistics of the DNN model and the determined layer statistics of the DNN model. Further, the data generator (141) determines whether the difference (loss) is less than the threshold. Further, the data generator (141) generates the data using the layer statistics of the DNN model and/or the weight distributions of the DNN model in response to determining that the difference (loss) is less than the threshold. The data (self-generated data) is a plurality of retro data images, wherein the plurality of retro data images are equivalent or represents all features of the DNN model. Further, the data generator (141) performs back propagation in the DNN model in response to determining that the difference (loss) is greater than the threshold.

The sensitive index controller (142) determines an accuracy using per-channel quantization and per-tensor quantization schemes at each layer of the DNN model. Further, the sensitive index controller (142) determines a sensitive index of each layer corresponding to per-channel quantization and per-tensor quantization. Further, the sensitive index controller (142) determines an optimal quantization for each layer of the DNN model based on the sensitive index to quantize the DNN model, where the sensitive index includes a minimum sensitivity. In an embodiment, the sensitive index is determined using a Kullback-Leibler Divergence. The optimal quantization includes the per-channel quantization and/or the per-tensor quantization, and/or a combination of the per-channel quantization and the per-tensor quantization for the DNN model. The sensitive index is used to reduce a Search space (S) of each layer of the DNN model from exponential ($2^n$) to linear (2n), where n is a number of layers in the DNN model.

The flexible bit allocator (143) allocates a dynamic bit precision for each channel of each layer of the DNN model. A detailed description of data generation, sensitive index/hybrid quantization, and dynamic bit precision are explained in FIG. 2A to FIG. 4.

Although FIG. 1 illustrates various hardware components of the electronic device (100) it is to be understood that various embodiments are not limited. In various embodiments, the electronic device (100) may include fewer or more components. Further, the labels or names of the components are used only for illustrative purpose and does not limit the scope of the disclosure. One or more components can be combined to perform the same or substantially similar function to quantize the DNN model.

Figure 2A:
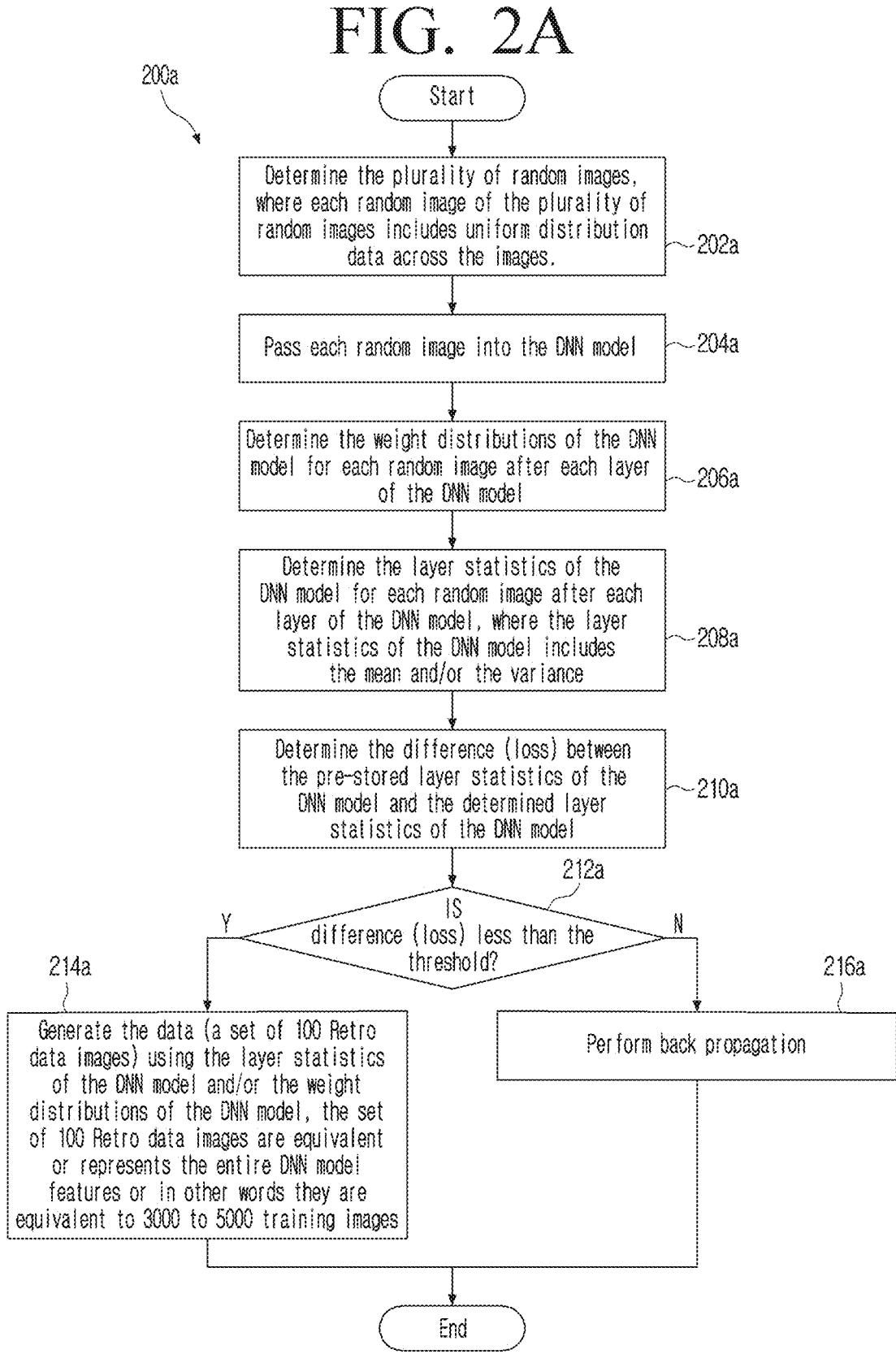
FIG. 2A is a flowchart illustrating an example method for generating self-generated data to estimate an activation range of each layer of the DNN model to quantize the DNN model, according to various embodiments.

FIG. 2A is a flowchart (200a) illustrating an example method for generating the self-generated data to estimate the activation range of each layer of the DNN model to quantize the DNN model, according to various embodiments.

At 202a, the method includes determining the plurality of random images (~100), where each random image of the plurality of random images includes the uniform distribution data across the images. At 204a, the method includes passing each random image into the DNN model. At 206a, the method includes determining the weight distributions of the DNN model for each random image after each layer of the DNN model. At 208a, the method includes determining the layer statistics of the DNN model for each random image after each layer of the DNN model, where the layer statistics of the DNN model includes the mean and/or the variance.

At 210a-212a, the method includes determining the difference (loss) between the pre-stored layer statistics of the DNN model and the determined layer statistics of the DNN model. At 214a, the method includes generating the data (a set of 100 Retro data images) using the layer statistics of the DNN model and/or the weight distributions of the DNN model in response to determining that the difference (loss) is less than the threshold (Yes in 212a), the set of 100 retro data images are equivalent or represents the entire DNN model features or in other words, the set of 100 retro data images are equivalent to 3000 to 5000 training images. At 216a, the method includes performing back propagation in the DNN model in response to determining that the difference (loss) is greater than equal to the threshold (No in 212a).

FIG. 2B is diagram flowchart (200b) illustrating an example method for generating the self-generated data to estimate the activation range of each layer of the DNN model to quantize the DNN model, according to various embodiments.

At 202b, the method includes determining the DNN model "M" with "N" number of BN layers. At 204b, the method includes generating a random set of data $x^r$ (input data) with normal distribution, because uniform/normal distribution is followed by all data distributions in general, initialize random data with uniform/normal distribution as well. At 206b, the method includes determining the pre-stored layer statistics (e.g., $i^{th}$ Batch Norm (BN) layer statics) of the DNN model. At 208b, the method includes determining whether the difference (loss) is less than the threshold (e.g. i<=Epochs), where the disclosed method iterates a loop until the calculated loss is less than or equal to a particular number of iterations, termed Epochs, which changes from model to model dependent on when the estimated loss is less than the defined threshold). At 210b, the method includes initiating a forward propagation on the input data ($x^r$) to determine intermediate output statics for $k^{th}$ layer (e.g. for the first layer (K=0)), where $\mu_k$=0, $\sigma_k$=1 are the mean and standard deviation of the $k^{th}$ layer and the initial value of the difference (loss) is zero.

At 212b-216b, the method includes determining whether a value of the $k^{th}$ layer is lesser than a value of the $N^{th}$ layer of the DNN model, determining the difference (loss) in pre-stored layer statistics of the DNN model (e.g. first layer (K=0)) and determined layer statistics of the DNN model for consecutive next $k^{th}$ layer of the DNN model (e.g. first layer (K=1)) by determining the value of the $\mu_k$, $\sigma_k$ for consecutive next $k^{th}$ layer of the DNN model, and updating the value of the $K^{th}$ layer and calculates the difference (loss) till the value of the $K^{th}$ layer is less than the value of the $N^{th}$ layer of the DNN model. The difference (loss) is calculated by below equation-1.

$$\min_{x^r} \sum_{k=0}^{n} \log\left(\frac{\sigma_k^{BN}}{\sigma_k}\right) + \frac{\sigma_k^2 + \left(\mu_k - \mu_k^{BN}\right)^2}{2\left(\sigma_k^{BN}\right)^2} - \frac{1}{2} \tag{1}$$

where $x^r$ is the input data, and n is the number of batch norm layers. $\mu_k$ and $\sigma_k$ are the mean and standard deviation of the $k^{th}$ layer for generated data respectively. $\mu_k^{BN}$ and $\sigma_k^{BN}$ the mean and standard deviation parameters of the $k^{th}$ batch norm layer of the model respectively. This generated data helps the electronic device (100) to address the challenge mentioned above e.g., to find the range of activation for each layer. The electronic device (100) also uses the same data for the hybrid quantization method.

At 218b-222b, the method includes determining $\overline{\mu_k}$, $\overline{\mu_k}$ for the input data ($x^r$) when the value of the $K^{th}$ layer is greater than the value of the $N^{th}$ layer of the DNN model, updating the difference (loss) for the $\overline{\mu_k}$, $\overline{\mu_k}$ and performing back propagation in the DNN model till the difference (loss) is greater than the threshold. At 224b, the method includes generating the data (e.g., self-generated data) using the layer statistics of the DNN model and/or the weight distributions of the DNN model when the difference (loss) is less than the threshold.

In an embodiment, the self-generated data is generated by quantizing without access to the training/validation dataset. The self-generated data is called 'Retro data' (100 images) for quantization of the model using the layer statistics and weight distributions of the original DNN model. The self-generated data avoids dependency on the training data. The electronic device (100) is very helpful in the case of privacy and security applications. Currently, all Artificial intelligence (AI) use-cases commercialized uses vendor-based quantization methods. Also they depend on the training data which may not be available to provide for a vendor in case of proprietary applications and security applications. The electronic device (100) can generate an in-house quantization method that avoids the dependency on the vendor-based solutions and hence no need to share the data with the vendor. The self-generated data (e.g. 100 images) when used for quantization gives very good accuracy as compared to 2,000 pixels resolution (2 k) to 3K images of the original training dataset. A single image represents many classes or features of the training dataset. The electronic device (100) is validated on Flagship (e.g. Galaxy series (GS)-21, GS-22, and Mid-tier products) and proved to give the best accuracy with optimal performance.

In an embodiment, the electronic device (100) uses a uniform asymmetric quantization method for quantizing the weights and activations. The electronic device (100) allows the electronic device (100) to calculate two parameters: Scale (A) and Zero-point (z). The electronic device (100) uses these two parameters to map floating-point values to integers. Scale is a step size of a tensor (e.g., weight/activation). Suppose a floating-point tensor is present in the range ($x_{min}$, $x_{max}$). In order to map this to k-bit precision, the electronic device (100) determines the scale using equation-2.

$$\text{scale}(\Delta) = \frac{x_{max} - x_{min}}{2^k - 1} \tag{2}$$

Zero points are an integer value that represents the zero of floating-point to integer exactly without any error. This is done to avoid quantization errors. Finally, the electronic device (100) maps floating-point to an integer using equation-3.

$$x_{int} = \text{round}\left(\frac{x}{\Delta}\right) + z \tag{3}$$

Figure 3A:
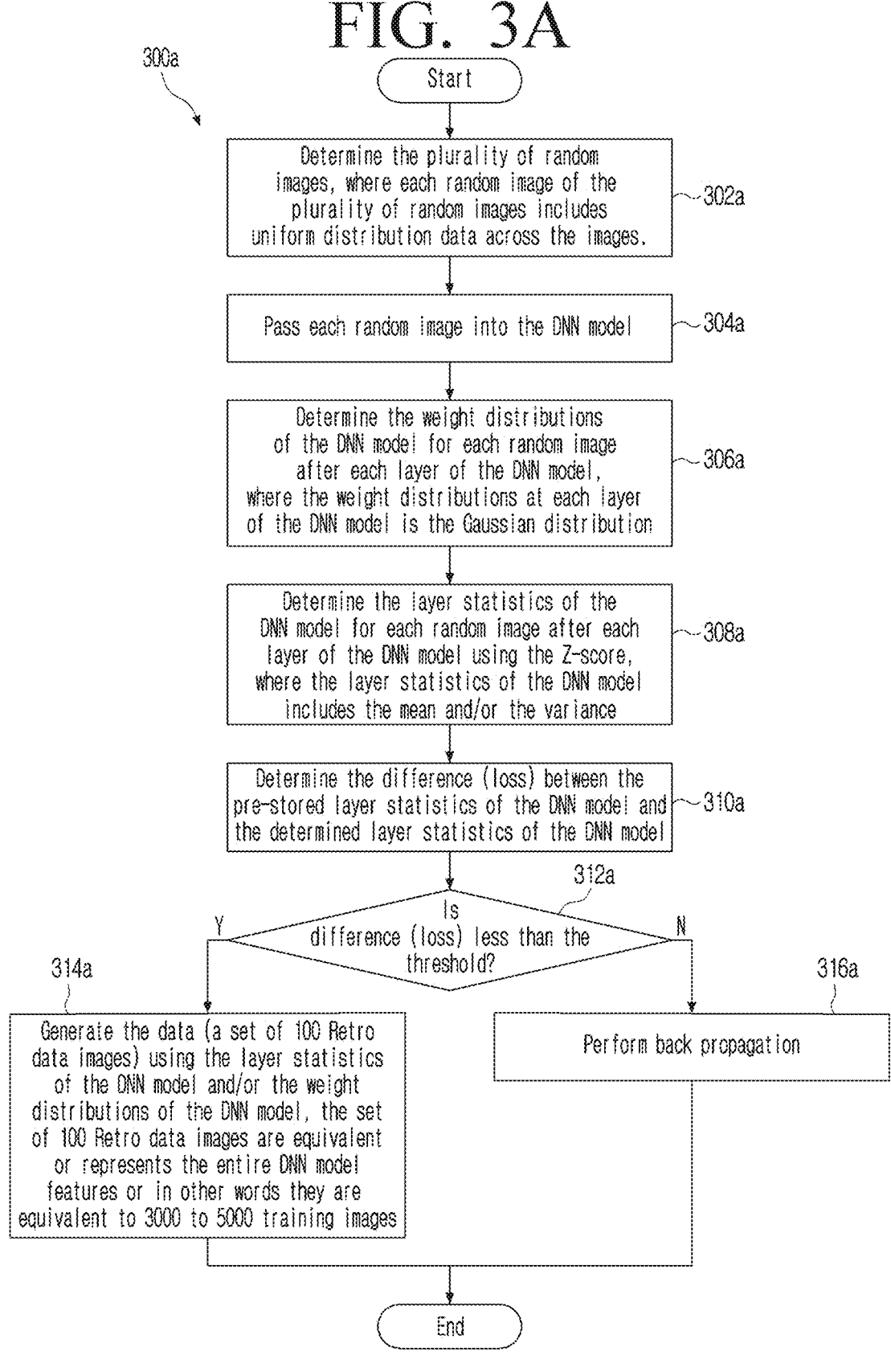
FIG. 3A is a flowchart illustrating an example method for generating the self-generated data using a Z-score to estimate the activation range of each layer of the DNN model to quantize the DNN model, according to various embodiments.

FIG. 3A is a flowchart (300a) illustrating an example method for generating the self-generated data using the Z-score to estimate the activation range of each layer of the DNN model to quantize the DNN model, according to various embodiments.

At 302a, the method includes determining the plurality of random images (~100), where each random image of the plurality of random images includes the uniform distribution data across the images. At 304a, the method includes passing each random image into the DNN model. At 306a, the method includes determining the weight distributions of the DNN model for each random image after each layer of the DNN model, where the weight distributions at each layer of the DNN model are the Gaussian distribution. At 308a, the method includes determining the layer statistics of the DNN model for each random image after each layer of the DNN model using the Z-score, where the layer statistics of the DNN model includes the mean and/or the variance.

At 310a-312a, the method includes determining the difference (loss) between the pre-stored layer statistics of the DNN model and the determined layer statistics of the DNN model. At 314a, the method includes generating the data (a set of 100 Retro data images) using the layer statistics of the DNN model and/or the weight distributions of the DNN model in response to determining that the difference (loss) is less than the threshold (Yes in 312a), the set of 100 retro data images are equivalent or represents the entire DNN model features or in other words, the set of 100 retro data images are equivalent to 3000 to 5000 training images. At 316a, the method includes performing back propagation in the DNN model in response to determining that the difference (loss) is greater than or equal to the threshold (No in 312a).

Figure 3B:
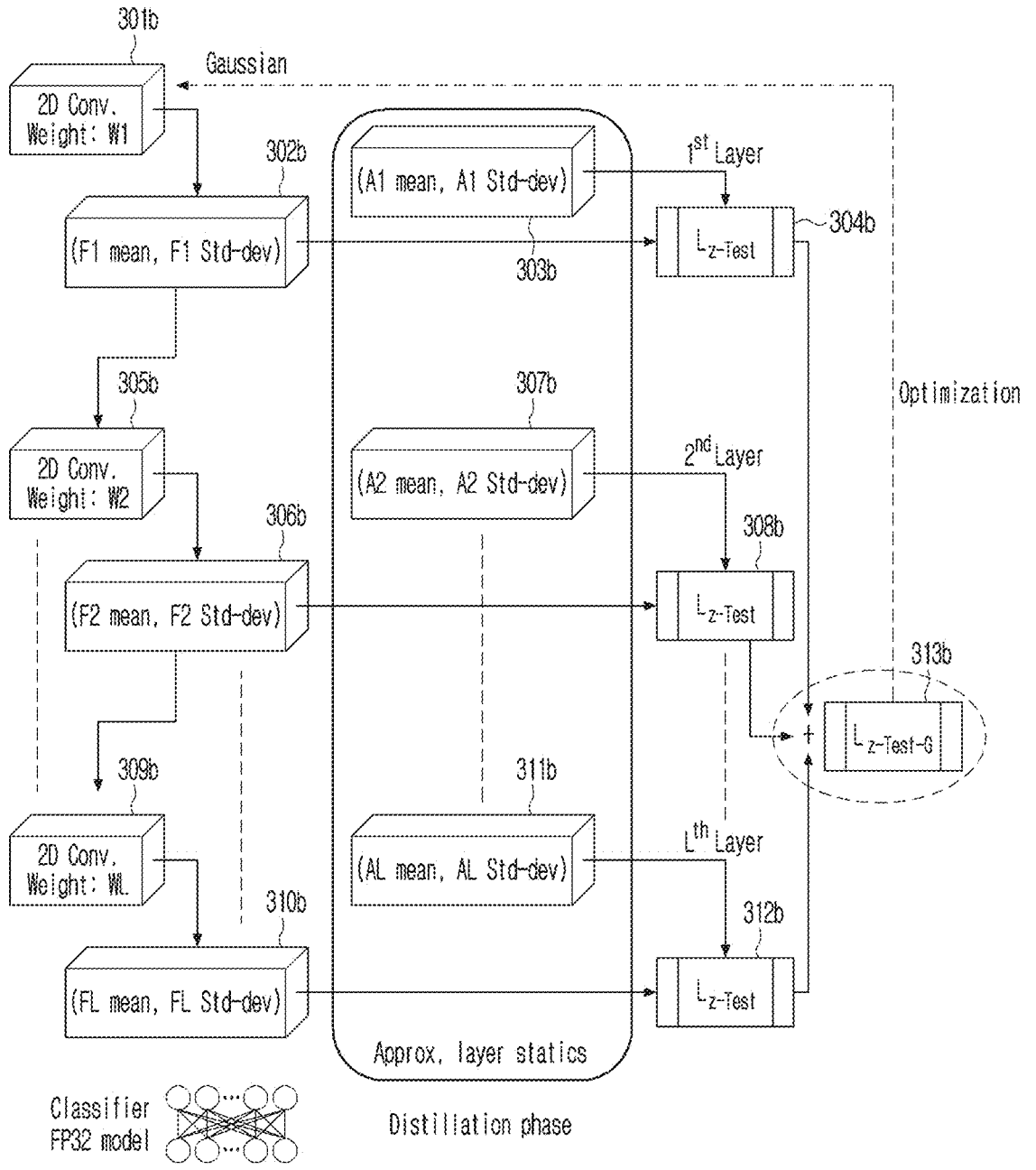
FIGS. 3B and 3C are diagrams illustrating example distilled-data estimation using the Z-score to estimate the activation range of each layer of the DNN model to quantize the DNN model, according to various embodiments.
Figure 3C:
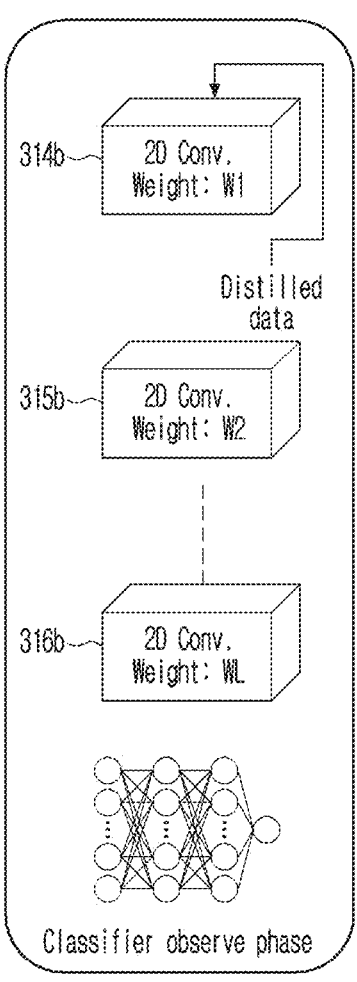

FIGS. 3B and 3C are diagrams illustrating example distilled-data estimation using the Z-score to estimate activation range of each layer of the DNN model to quantize the DNN model, according to various embodiments.

Referring to FIG. 3A: 2D cony (301b, 305b, 309b) indicates a convolution operation in two dimensions. The image or feature from a preceding layer(s) is used as the input to the 2D cony. This is a general operation that may be used in any Convolutional Neural Network (CNN) or Deep Neural Network (DNN). "F1, F2, . . . , FL" (302b, 306b, 310b) indicates original mean and standard deviation data are kept in the supplied model. Computed by running the original training data through it. "A1, A2, . . . , AL" (303b, 307b, 3111b) indicates mean and standard deviation of the activations (Activation layers) generated in each iteration by providing random input data. A Z-test (304b, 308b, 312b, 313b) is a method for estimating the difference between two distributions; in this case, uses it to compute the difference between the F1, F2, . . . , FL and A1, A2, . . . , AL distribution statistics. The Z-test at each layer (1, 2, 3, . . . L) is done to calculate a loss and propagate it back in the model it reduces/less than the threshold value.

Assume the input (for distilled-data estimation) to be the Gaussian noise with mean 0 and std-dev 1.

Instead of the L2 norm, the electronic device (100) has considered the absolute difference of the Z-Score Test as a loss function for data distillation.

L2 norm, in general, is observed to favour the data instead of its distribution. Whereas, Z-Test may be a proper way of estimating the difference between two distributions.

Following the intuition about the data on whether to use L1/L2 norm, the electronic device (100) has followed the general assumption of the first several layers with dense and last layers with the sparse distribution. As last-few layers have a high impact on classification, the electronic device (100) has taken the absolute difference of our proposed loss.

For the case where certain layers have BN and the rest of the others do not assume as follows:

At the end of the training of a Deep Convolutional Neural Network (CNN), almost all weights converge to a Gaussianlike distribution. It has been observed experimentally, and to confirm the assertion, the electronic device (100) can leverage the Central Limit Theorem (CLT).

Since the previous layer has BN, it certainly follows Gaussian distribution (clipped if ReLU has been used afterward) with stored batch norm stats as mean and std-dev.

Therefore, with the weights of the current layer (without BN) and input as Gaussians, the result of their convolution is also a Gaussian, which has been observed experimentally also.

Referring to FIG. 3B: Generating the data (a set of 100 Retro data images) using the layer statistics of the DNN model and/or the weight distributions of the DNN model, the set of 100 Retro data images are equivalent or represents the entire DNN model features or in other words they are equivalent to 3000 to 5000 training images.

FIG. 4 is a flowchart (400) illustrating an example method for the hybrid quantization, according to various embodiments.

At 402, the method includes determining the accuracy using the per-channel quantization and the per-tensor quantization schemes at each layer of the DNN model. At 404, the method includes determining the sensitive index of each layer corresponding to the per-channel quantization and the per-tensor quantization. At 406, the method includes determining the optimal quantization for each layer of the DNN model based on the sensitive index to quantize the DNN model, where the sensitive index includes a minimum sensitivity.

In an example embodiment, the electronic device (100) efficiently estimates the hybrid sensitivity index technique that determines the best Per-Tensor (PT) and Per-Channel (PC) combination for quantizing the entire DNN model. With two possibilities (PT/PC) for each layer the search space (S) currently has a size of $2^n$, where n is the number of layers. The electronic device (100) uses the Kullback-Leibler Divergence (KL divergence) to estimate the sensitivity index of each layer corresponding to each PT/PC. Using a sensitivity calculation (shown in equation 4) the electronic device (100) reduces our search space from exponential ($2^n$) to linear (2n). The electronic device (100) uses the following equation 4 to calculate the sensitivity of each layer:

$$\varepsilon_i(PT/PC) = \frac{1}{N}\sum_{j=1}^{N} KL\big(\mathcal{M}(W; x_j),\ \mathcal{M}(\tilde{W}_i(PT/PC); x_j)\big) \quad (4)$$

Here, $\varepsilon_i$ is sensitivity of $i^{th}$ layer of model $\mathcal{M}$. $\tilde{W}_L$ is quantized weight parameter of the DNN model using the PT/PC method. $x_j$ is input data and N is batch size. KL is the KL divergence equation.

The electronic device (100) measures the overall sensitivity of the model for each possible configuration. Finally, the electronic device (100) choose the configuration with minimum sensitivity, $$\min_{\{k_i=(PT,PC)\}} \varepsilon_{sum} = \sum_{i=1}^{N} \varepsilon_i(k_i) \quad (5)$$

In an example embodiment, the best possible quantization configuration (per-tensor or per-channel) for each layer is determined based on the sensitivity index. The sensitivity index information is embedded at each layer using a single bit. The hybrid quantization method results in a minimum of 35% improved performance (quantization speed) and also achieves better accuracy as compared to per-channel quantization schemes.

In an example embodiment of bit allocation scheme (e.g., dynamic bit allocation) for mixed-precision, the electronic device (100) allocates different bit precision for different channels of the layer with the constraint that the overall bit precision of the layer remains the same. For example, while quantizing the layer to 4-bit precision, the electronic device (100) can quantize some channels to a precision less than 4, some to a precision greater than 4, and the remaining channels to a precision of 4. In this scenario, the electronic device (100) takes care to keep the overall precision of the layer as 4-bit. In short, the electronic device (100) allocates 'N' number of the interval to 'C' number of channels of a layer such that, the overall quantization noise of the layer is minimized in terms of mean-square-error. Mathematically, for a layer with N number of channels, the electronic device (100) aims to solve the following optimization problem.

$$\min \sum_{i=0}^{N} E\left[\left(X_i - Q(X_i^{M_i})\right)^2\right] \text{ s.t. } \sum_{i=0}^{N} 2^{M_i} = \beta \qquad (6)$$

Where $$\beta = 2^b \times N, \ X_i, \ Q(X_i^{M_i})$$

are the actual float tensor and Quantized tensor to $M_i$ precision respectively. $\beta$ is the total interval for the layer when quantized to the overall precision of b bits.

The various actions, acts, blocks, steps, or the like in the flow diagrams (200a, 200b, 300a, and 400) may be performed in the order presented, in a different order, or simultaneously. Further, in various embodiments, some of the actions, acts, blocks, steps, or the like may be omitted, added, modified, skipped, or the like without departing from the scope of the disclosure.

Figure 5:
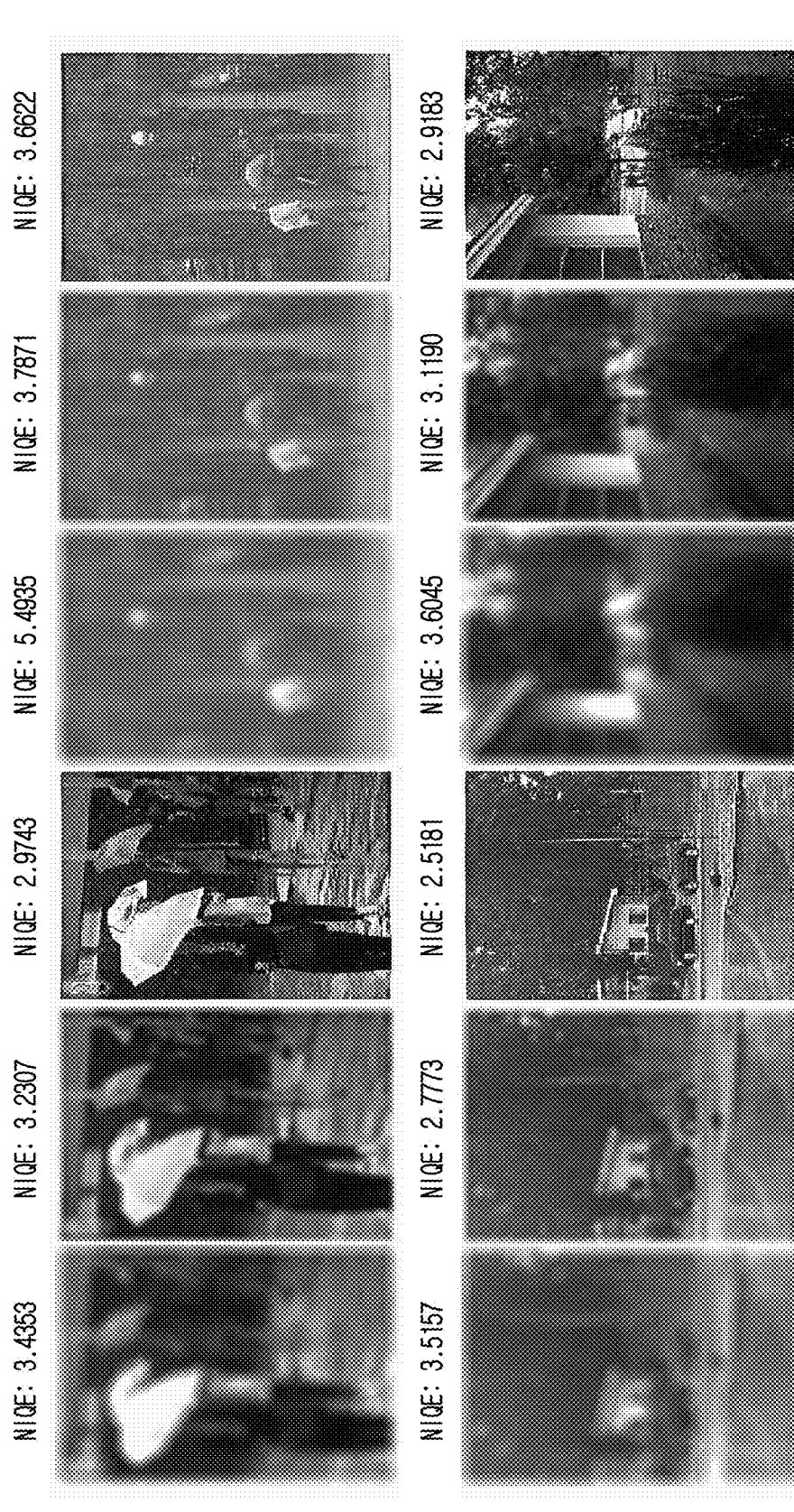
FIG. 5 is a diagram illustrating example evolution results of the electronic device, which provides improved accuracy and performance in all types of vision and non-vision-based use cases, according to various embodiments.

FIG. 5 is a diagram illustrating example evolution results of the electronic device (100), which provides improved accuracy and performance in all types of vision and non-vision-based use cases, according to various embodiments.

Sample images of single image rain streak removal use case with the INT8 quantized outputs of state-of-the-art method and the electronic device (100). Naturalness Image Quality Evaluator (NIQE) lower is better, a lower NIQE value suggests a higher level of image quality. This shows that the electronic device (100) gives better accuracy along with the better performance in all types of vision and non-vision-based use cases.

In an example embodiment, the disclosed method is supported 8 bit like GPU, DSP, and NPU. The electronic device (100) is compatible with models developed with various DNN frameworks such as Caffe, Tensorflow, PyTorch, etc. The electronic device (100) may take 5 minutes for offline quantization whereas DFQ takes around 1 hour. The disclosed method is 12× faster than DFQ. The disclosed method can be run on any Linux machine and it's faster than any post-processing quantization scheme available in the market like Qualcomm post-processing quantization or LSI (EDEN) post-processing quantization scheme. Because it runs on a very limited number of images (50) to predict the quantization range with the help of the disclosed data generation method. This is one of the advantages of the disclosed method that, it's faster to quantize the DNN float model with better accuracy.

The disclosed method provides an in-house dataset independent Post-training Quantization method, with the below advantages:

Dataset independent method.

Generates its dataset of around 100 images which represents all the features of the training dataset from the original DNN model.

Very fast as quantization is done only using 100 images as compared to regular methods (2) which uses 3 k to 5 k images of training dataset for quantization.

Is applicable for privacy applications where training dataset sharing is not feasible.

Vendor dependency is avoided as this method is developed completely in-house.

The embodiments disclosed herein can be implemented using at least one hardware device and performing network management functions to control the elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for quantizing a Deep Neural Network (DNN) model in an electronic device comprising a quantization engine, wherein the quantization engine comprises processing circuitry and/or executable program instructions, operably connected to the memory and the processor, the method comprising:

estimating, by the quantization engine, at least one of an activation range of each layer of the DNN model using self-generated data and a sensitive index of each layer of the DNN model; and quantizing, by the quantization engine, the DNN model based on the at least one of the activation range and the sensitive index wherein estimating, by the quantization engine, the activation range of each layer of the DNN model using the self-generated data comprises:

determining, by the quantization engine, a plurality of random images, wherein each random image of the plurality of random images comprises uniform distribution data across the images;

passing, by the quantization engine, each random image into the DNN model;

determining, by the quantization engine, weight distributions of the DNN model for each random image after each layer of the DNN model;

determining, by the quantization engine, layer statistics of the DNN model for each random image after each layer of the DNN model, wherein the layer statistics of the DNN model comprises at least one of a mean and a variance;

determining, by the quantization engine, a difference between pre-stored layer statistics of the DNN model and the determined layer statistics of the DNN model;

determining, by the quantization engine, whether the difference is less than a threshold; and performing, by the quantization engine, one of:

generating the data using at least one of the layer statistics of the DNN model and the weight distributions of the DNN model in response to determining that the difference is less than the threshold, or executing back propagation in the DNN model in response to determining that the difference is greater than or equal to the threshold.

2. The method as claimed in claim 1, wherein the self-generated data is generated based on at least one of layer statistics of the DNN model and weight distributions of the DNN model.

3. The method as claimed in claim 1, wherein the DNN model quantizes weights and activation at lower bit precision without access to at least one of training dataset and validation dataset to obtain a compression of the DNN model and a fast inference of the DNN model.

4. The method as claimed in claim 1, wherein the self-generated data is a plurality of retro data images, wherein the plurality of retro data images are equivalent or represent all features of the DNN model.

5. The method as claimed in claim 1, wherein a Z-score provides a difference between two distributions.

6. The method as claimed in claim 1, wherein the self-generated data is a plurality of retro data images, wherein the plurality of retro data images are equivalent or represent all features of the DNN model.

7. The method as claimed in claim 1, wherein estimating, by the quantization engine, the sensitive index of each layer of the DNN model comprises:

determining, by the quantization engine, an accuracy using per-channel quantization and per-tensor quantization schemes at each layer of the DNN model; and determining, by the quantization engine, a sensitive index of each layer corresponding to per-channel quantization and per-tensor quantization.

8. The method as claimed in claim 1, wherein quantizing, by the quantization engine, the DNN model based the sensitive index comprises:

determining, by the quantization engine, an optimal quantization for each layer of the DNN model based on the sensitive index to quantize the DNN model, wherein the sensitive index comprises a minimum sensitivity; and applying, by the quantization engine, the optimal quantization for each layer of the DNN model.

9. The method as claimed in claim 1, wherein the sensitive index is determined a using a Kullback-Leibler Divergence.

10. The method as claimed in claim 8, wherein the optimal quantization comprises at least one of per-channel quantization, and per-tensor quantization for the DNN model.

11. The method as claimed in claim 1, wherein the sensitive index is used to reduce a search space of each layer of the DNN model from exponential to linear, wherein n is a number of layers in the DNN model.

12. The method as claimed in claim 1, wherein the method comprises:

allocating, by the quantization engine, a dynamic bit precision for each channel of each layer of the DNN model, wherein the allocated dynamic bit precision minimizes and/or reduces overall quantization noise of each layer.

13. An electronic device configured to quantize a Deep Neural Network (DNN) model, the electronic device comprising:

a memory;

a processor comprising processing circuitry; and a quantization engine comprising processing circuitry and/or executable program instructions, operably connected to the memory and the processor, configured to:

estimate at least one of an activation range of each layer of the DNN model using self-generated data and a sensitive index of each layer of the DNN model;

determine a plurality of random images, wherein each random image of the plurality of random images comprises uniform distribution data across the images;

pass each random image into the DNN model;

determine weight distributions of the DNN model for each random image after each layer of the DNN model;

determine layer statistics of the DNN model for each random image after each layer of the DNN model, wherein the layer statistics of the DNN model comprises at least one of a mean and a variance;

determine a difference between pre-stored layer statistics of the DNN model and the determined layer statistics of the DNN model;

determine whether the difference is less than a threshold;

perform, one of:

generate the data using at least one of the layer statistics of the DNN model and the weight distributions of the DNN model in response to determining that the difference is less than the threshold; or execute back propagation in the DNN model in response to determining that the difference is greater than or equal to the threshold; and quantize the DNN model based on the at least one of the activation range and the sensitive index.

* * * * *